March 13, 1956 H. LEVINE 2,738,034
LIFTING TRUCKS
Filed March 12, 1952 2 Sheets-Sheet 1
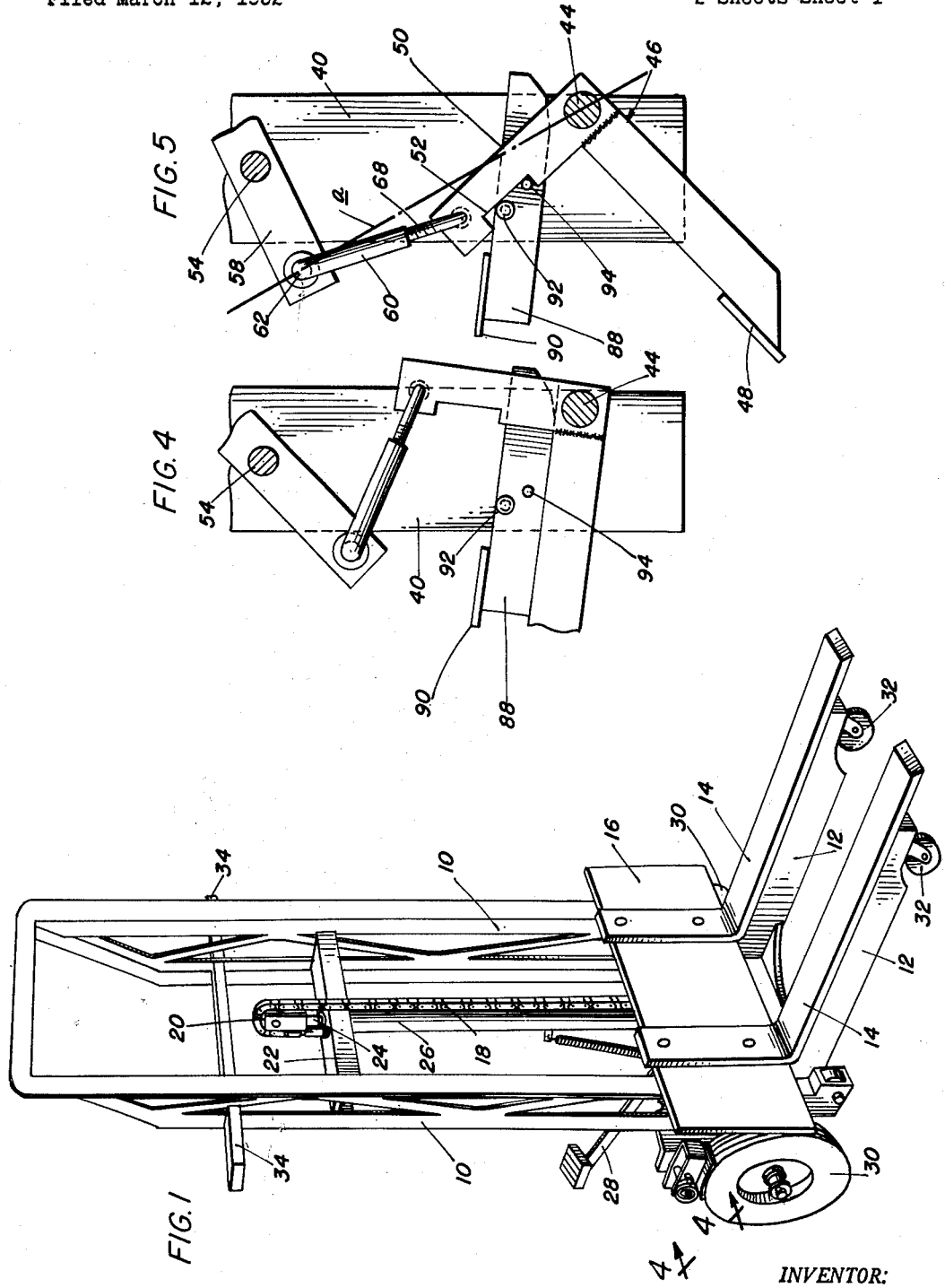
INVENTOR:
HYMAN LEVINE
BY
Kent W. Wonnell
ATT'Y

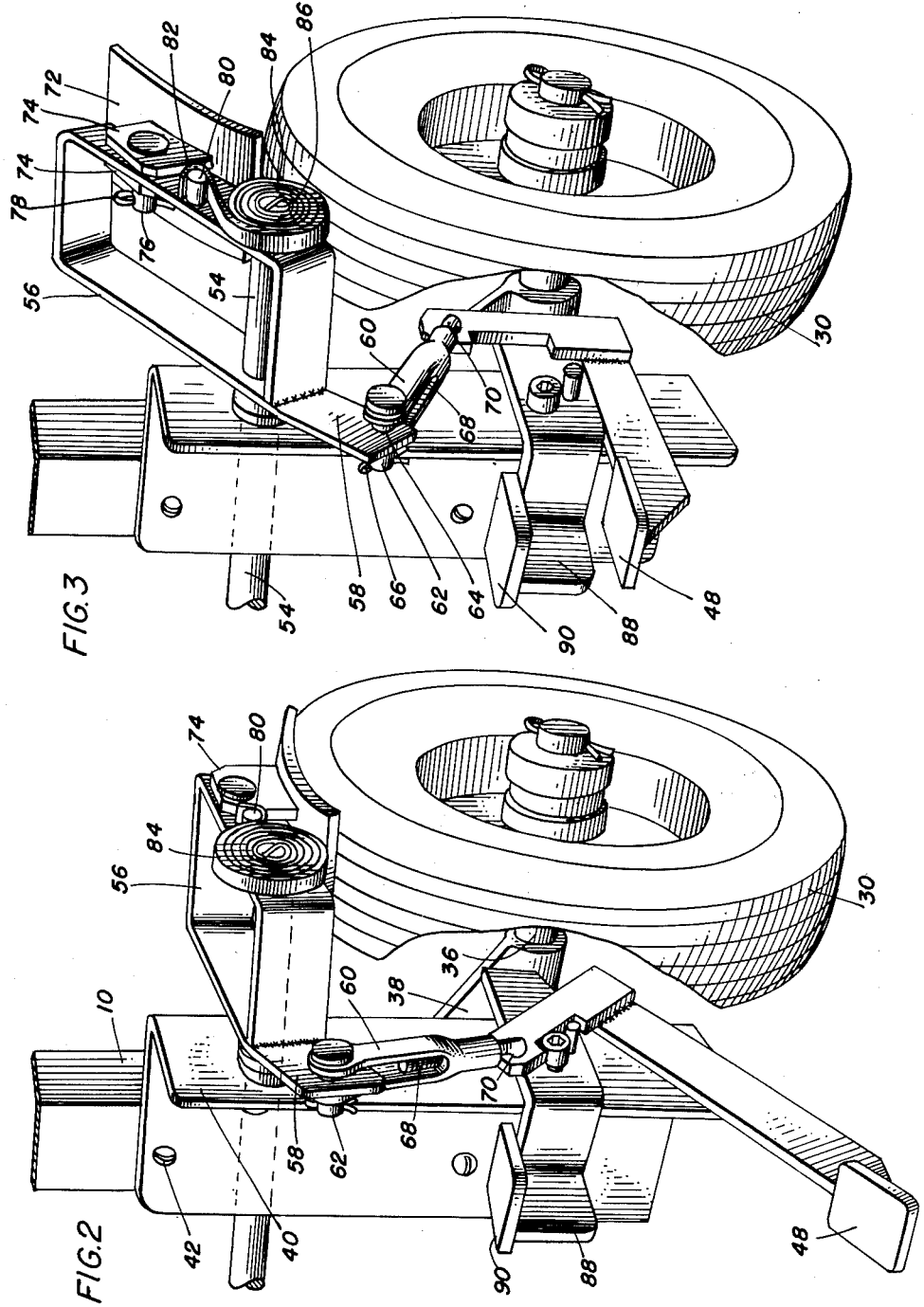

United States Patent Office 2,738,034
Patented Mar. 13, 1956

2,738,034

LIFTING TRUCKS

Hyman Levine, Chicago, Ill., assignor to Big Joe Manufacturing Co. Inc., Chicago, Ill., a corporation of Illinois Application March 12, 1952, Serial No. 276,088

4 Claims. (Cl. 188—29)

This invention relates to lifting trucks and is more particularly described as a wheel brake for a structure of this kind although it may have a more general use wherever applicable.

Lifting trucks of this kind are adapted to be moved from one place to another and it is desirable to hold the truck in any location by engaging or locking the wheels thereof so that the truck will remain in any position in which it is set.

An important object of the invention is in the provision of lever operated means for engaging the wheels of the truck for locking them against rotation.

A further object of the invention is to provide lever operated means for releasing the locking engagement of the wheels whenever desired.

A still further object of the invention is to provide lever operating means for engaging and releasing the wheels comprising foot operated levers.

Still a further object of the invention is to provide resilient means for engaging the periphery of the wheel or wheels which is adjustable so that the pressure upon the wheel can be regulated.

Other objects of the invention will appear in the specifications and will be apparent from the accompanying drawings in which, Fig. 1 is a perspective view of a hand truck to which the brake mechanism of this invention is applied.

Fig. 2 is an enlarged perspective view showing the application of a brake to one of the wheels;

Fig. 3 is a perspective view similar to Fig. 2 showing the brake in its raised or non-operating position;

Fig. 4 is an enlarged detail view showing the positions of some of the operating parts when the brake is in non-operating position; and Fig. 5 is an enlarged detail view showing the position of the lever and operating parts when the brake is applied.

In a wheeled lift truck to which this invention is applied, it is frequently necessary to maintain the truck in a fixed position upon the floor or any other surface upon which it is movable and the engagement of the traction wheels by this brake mechanism is operative to firmly hold the truck in a fixed position in the desired location.

Referring now more particularly to the drawings, an upright truck framework 10 has a lower fixed base comprising parallel members 12 spaced apart and extending substantially at right angles to the framework at the sides of the truck. Mounted for vertical movement in the framework is a truck carrier comprising angular fork extensions 14 secured to an upright plate 16 movable vertically on the framework by means of a chain 18 attached at one end to the plate 16, extending upwardly therefrom and passing over a sprocket 20 and thence downwardly to engage a cross piece 22 in the framework. The sprocket is mounted at the upper end of a piston 24 movable in a cylinder 26 under the action of fluid pressure so that the lower portion of the chain and the truck carrier connected thereto is moved upwardly twice the movement of the piston and the sprocket 20 carried at the upper end thereof in a well known manner.

Fluid pressure in the cylinder 26 is increased for raising the truck carrier by means of a lever pedal 28 but the truck carrier and its movement are incidental to the operation of the wheel brakes which comprise the present invention. A wheel 30 is mounted at each side of the framework 10 at one side of the carrier plate 16 and at the front ends of the forwardly extending parallel members 12 are pivoted wheels 32 for steering the truck in any desired direction. Projecting oppositely from the upper portions of the framework 10 are handles 34 by means of which the truck may be pushed and guided from one place to the other by the wheels 32.

Each wheel 30 is mounted upon an axle 36 projecting from a bearing 38 secured to the framework and the axle may be common to the two opposite wheels or it may be a separate section mounted at each side of the framework.

At the inside of each wheel is a metal angle plate 40 secured to the adjacent framework 10 by fastening screws 42 or other suitable means having one web parallel with and spaced from the inner side of the wheel. Mounted on a pivot 44 secured to one of the plates 40 is a locking lever 46 generally in the form of a bell crank having a generally horizontal arm with a foot contact 48 at its outer end and a generally vertical arm 50 with a recess 52 at the relatively inner side thereof, connected to the outer end of the extension 50. A shaft 54 is mounted in the angle plates 40 at opposite sides of the frame and extends beyond the outer side of each of the angle plates where it provides a pivotal mounting for a brake shoe holder 56. This holder is preferably of open rectangular form having an extension 58 at one end by means of which the holder may be partially rotated. Connected to the outer end of the extension 58 and the arm 50 of the bell crank lever 46 is an adjustable link comprising a socket 60 having bifurcated ends straddling the extremity 58 with a pivot pin 62 extending through holes in the ends of the bifurcations and through a hole 64 in the end of the extension 58. This pivot pin may be locked in place by a cotter 66. Into the other end of the socket, a pin 68 is threaded which has a headed bent extremity extending through an opening 70 at the outer end of the arm 50. By threading the pin 68 into the socket and connecting the pivot pin through the extension 58, the desired adjustment can be obtained between the bell crank and the brake shoe holder to move the latter in accordance with the movement of the lever.

A brake shoe 72 has spaced ears 74 adapted to extend in opposite sides of one portion of the holder 56 and a headed pivot pin 76 extends through the ears and through a corresponding opening in the holder with a cutter 78 extending through the inner end of the pin for mounting the brake shoe 72 to have a limited rotating movement in the holder, the brake shoe being curved to conform to the outer surface of the wheel 30.

Extending outwardly from the holder is a projection 80 about which is engaged a curved end 82 of a coil spring 84, the spring being mounted at the outer side of the brake shoe holder and secured thereto at its inner end by a screw 86 which may be inserted into the side of the holder or into the end of the brake shoe holder mounting shaft 54. This spring is wound in a direction tending to rotate the holder about the shaft in a direction to raise the brake shoe 72 from its engagement with the wheel 30 and likewise to rotate the connected locking lever 46 to assume its horizontal position as represented in Figs. 3 and 4.

Mounted above the locking lever is a releasing lever 88 which has an operating pedal 90 substantially parallel with the pedal 48 of the locking lever when the brake is in its released position. The release lever is mounted upon a pivot 92 intermediate the ends thereof extending into and supported by the angle plate 40. Secured to and projecting laterally from the lever 88 is a knock-out pin 94 which extends at the outer side of the lever and is adapted to engage in the recess 52 of the locking lever 46 when it is moved to its brake engaging position.

In operation, assuming the wheel (or wheels) 30 is not engaged by the brake, the locking levers 46 and the release lever will be parallel and adjacent to each other as shown more clearly in Figs. 3 and 4. When it is desired to engage the wheel with the brake shoe, the locking lever 46 is depressed by engaging the pedal 48 which rotates the arm 50 of the locking lever until the stop pin 94 is engaged in the recess 52. At this time, the arm 50 of the locking lever and the link 60 will be moved past a center line $a$ extending between the pivots 44 and 62 of the locking lever 46 and the extension 58 of the brake holder respectively. This will hold the brake shoe 72 tightly against the outer periphery of the wheel 30 locking it tightly in place, the brake shoe conforming to the surface of the wheel and the wheel usually having a rubber or other resilient tire which is tightly engaged by the brake shoe. In this position, the wheel is locked tightly in position and the spring 84 cannot release the brake until the joint connection between the locking lever and the extension 58 is moved past the center line $a$ between their pivots 44 and 62. The release lever is held in substantially horizontal position by the engagement of its knock-out pin 54 in the recess 52 of the release lever arm 50, but it is substantially balanced by a rear extension opposite its pedal 90 so that there is no tendency to release the locking lever except by a direct engagement of the pedal 90 at the outer end of the release lever 88. When the pedal is engaged and pressed downwardly, the knock-out pin 94 is moved upwardly (Fig. 5) to engage the inner edge of the recess 52 which moves the arm 50 toward the center line $a$ until it is moved past the locking point whereupon the spring 84 is of sufficient strength to continue the movement of the locking lever in the same direction, whereupon the brake shoe holder is raised, the brake shoe 72 is disengaged from the wheel 30 and the release of the lever 88 allows the horizontal arm of the locking lever 46 to engage below the locking lever 88 and to move them together in parallel relation as shown in Figs. 3 and 4.

Although a single brake shoe holder and brake shoe construction is shown and described in detail, it will be understood that the other wheel 30 on the opposite side of the truck is also provided with a similar brake holder and brake shoe construction which is mounted at the other end of the shaft 54, the shaft extending through from one side of the framework to the other so that the two brake shoe holders and the brakes thereof are operated in conjunction by the locking lever and release lever at one side of the frame.

With this construction, a positive and definite locking engagement can be quickly applied to both of the main traction wheels of the truck by simply depressing the locking lever which will hold the truck against movement in any direction, thereby setting or fixing it for the operation of the lifting mechanism. To release both wheels from their locking engagement, the release lever 88 is operated by depressing the front or projecting end thereof, and the locking lever is moved out of its locking position allowing the spring (or springs) 84 to swing the holders 56 and the brake shoe 72 thereof out of engagement with the wheels 30.

While a preferred construction has been described in some detail, it should be regarded as an illustration or example rather than as a restriction or limitation of the invention, as various changes in the construction, combination, and arrangement of the parts may be made without departing from the spirit and scope of the invention.

I claim:

1. In a wheeled lift truck having pilot wheels and traction wheels for moving the truck freely upon its supporting surface, the improvement of brake means for engaging the traction wheels and locking the truck in any fixed position, the brake means comprising a pair of locking and release pedal levers and supporting means pivoting them in adjacent parallel positions when the brake means is released, a shaft pivoted in the supporting means, a brake holder mounted on the shaft having a portion to engage a traction wheel at one side of the shaft and a projection extending therefrom at the other side of the shaft, a spring engaging the shaft and the holder tending to press it in engagement with a traction wheel, an arm fixed to the locking pedal and extending over the adjacent portion of the release pedal, means projecting from the release pedal into the path of the arm when the locking pedal is depressed, and a link pivotally connected to the end of the arm and the end of the projection of the brake holder, the release lever projection being engaged by the arm when the connection between the arm and the link is moved by the brake pedal past a center line connecting the pivot of the brake lever and the connection of the link with the projection of the brake holder, and the release lever being operable to move the pivot point of the arm and the connecting link past the locking center line opposite to its movement by the locking lever for releasing the brake holder.

2. A brake structure in accordance with claim 1, in which the locking lever and the projecting arm are in the form of a right angle bell crank and the link connecting the free end of the arm with the projection of the holder is adjustable in length, and the spring on the holder tends to maintain the locking lever in its operated position with the holder in engagement with a traction wheel.

3. A brake structure in accordance with claim 2, in which one edge of the arm of the bell crank is formed with a recess and the recess lever has a pivot upon which it is mounted projecting laterally therefrom at the same side as the same projection so that the recess engages the said projection and also the projecting pivot to limit the movement of the locking lever in a direction urged by the said spring of the holder, the release lever being depressed in the same direction as the locking lever engaging the said projection with the bottom of the recess to move the arm past the locking center between the locking lever and the holder to release the holder from engagement with the wheel.

4. A brake structure in accordance with claim 2 in which there are a pair of wheels one at each opposite side of a frame to which the supporting means is attached and a holder with a brake shoe for each of the wheels, the said shaft being common to the two holders and each holder having a coil spring connected to the shaft and to the holder which tends to move the locking lever in a direction opposite to its locking position and is operative to so move it as soon as the pivotal connection between the holder and the arm of the locking lever is moved by the release lever past the locking center in a direction opposite the locking direction until the release and locking levers are parallel and extend in contact with each other in a horizontal direction.

References Cited in the file of this patent

UNITED STATES PATENTS

| | | |
|---|---|---|
| 1,171,268 | Smith | Feb. 8, 1916 |
| 1,915,286 | Bleustein | June 27, 1933 |
| 2,250,990 | Feldman | July 29, 1941 |
| 2,338,645 | James | Jan. 4, 1944 |
| 2,372,852 | Randall | Apr. 3, 1945 |
| 2,591,524 | Douglas et al. | Apr. 1, 1952 |
| 2,607,502 | Willitts | Aug. 19, 1952 |
| 2,639,785 | Vickers | May 26, 1953 |

FOREIGN PATENTS

| | | |
|---|---|---|
| 60,170 | Denmark | Sept. 21, 1942 |